United States Patent
McLaughlin et al.

(10) Patent No.: US 11,305,862 B2
(45) Date of Patent: Apr. 19, 2022

(54) JOINT JOINING AN AIRCRAFT WING TO AN AIRCRAFT BODY

(71) Applicant: The Boeing Company, Chicago, IL (US)

(72) Inventors: Mark R. McLaughlin, Snohomish, WA (US); Jenny Young, Seattle, WA (US); Drew-Daniel T. Keefe, Maple Valley, WA (US); Charles B. Lockin, Bothell, WA (US); David H. Leibov, Seattle, WA (US)

(73) Assignee: The Boeing Company, Chicago, IL (US)

( * ) Notice: Subject to any disclaimer, the term of this patent is extended or adjusted under 35 U.S.C. 154(b) by 313 days.

(21) Appl. No.: 16/722,186

(22) Filed: Dec. 20, 2019

(65) Prior Publication Data

US 2021/0188419 A1 Jun. 24, 2021

(51) Int. Cl.
*B64C 1/26* (2006.01)
*B64F 5/10* (2017.01)
*B64C 1/00* (2006.01)
*B64C 1/12* (2006.01)

(52) U.S. Cl.
CPC .......... *B64C 1/26* (2013.01); *B64C 1/00* (2013.01); *B64C 1/12* (2013.01); *B64F 5/10* (2017.01); *B64C 2001/0072* (2013.01); *B64C 2001/0081* (2013.01)

(58) Field of Classification Search
CPC ..................................... B64C 1/26; B64C 7/00
See application file for complete search history.

(56) References Cited

U.S. PATENT DOCUMENTS

| | | | | |
|---|---|---|---|---|
| 3,499,622 A * | 3/1970 | Surcin | ............... | B64C 1/26 244/130 |
| 5,297,760 A * | 3/1994 | Hart-Smith | ............... | B64C 1/12 244/132 |
| 7,195,418 B2 * | 3/2007 | Durand | ............... | B64C 1/26 403/217 |

(Continued)

FOREIGN PATENT DOCUMENTS

EP 2824030 1/2015

OTHER PUBLICATIONS

Extended Search Report dated May 11, 2021 issued in co-pending EP PT App No. 20215650.1.

*Primary Examiner* — Brian M O'Hara
*Assistant Examiner* — Michael B. Kreiner
(74) *Attorney, Agent, or Firm* — Quinn IP Law

(57) ABSTRACT

A joint joining an aircraft wing to an aircraft body employs a splice panel that is engaged in surface engagement with a skin panel on a side of the aircraft body and is engaged in surface engagement with a leg panel extending upwardly from the aircraft wing. A plurality of fasteners extend through the splice panel and the leg panel and extend through the splice panel and the skin panel. The plurality of fasteners attach the splice panel to the skin panel and attach the splice panel to the leg panel and thereby attach the skin panel to the leg panel. After fastener holes have been drilled through the splice panel and the leg panel to attach the splice panel to the leg panel, the splice panel can be removed from the leg panel. This provides easy access to the fastener holes drilled through the leg panel for deburring of the fastener holes.

20 Claims, 5 Drawing Sheets

(56) References Cited

U.S. PATENT DOCUMENTS

| | | | |
|---|---|---|---|
| 8,573,539 B2* | 11/2013 | Honorato Ruiz | B64C 1/26 244/123.1 |
| 9,688,382 B2* | 6/2017 | Delahaye | B64F 5/10 |
| 2002/0078545 A1* | 6/2002 | Munk | B23P 21/00 29/407.01 |
| 2005/0224655 A1* | 10/2005 | Guittard | B64C 1/26 244/133 |
| 2006/0018710 A1* | 1/2006 | Durand | B64C 1/26 403/408.1 |
| 2007/0051851 A1* | 3/2007 | Ruffin | F16B 5/0275 244/131 |
| 2011/0147521 A1* | 6/2011 | Delahaye | B64C 1/26 244/119 |
| 2012/0286090 A1 | 11/2012 | Guittard | |
| 2013/0020440 A1* | 1/2013 | Honorato Ruiz | B64C 1/26 244/131 |
| 2014/0263836 A1* | 9/2014 | Guillemaut | F16B 5/02 244/131 |
| 2014/0361121 A1* | 12/2014 | Cominsky | B64C 1/26 244/131 |
| 2015/0014484 A1* | 1/2015 | Zeon | B64C 1/26 244/131 |
| 2015/0041589 A1* | 2/2015 | Hasan | B64C 3/182 244/119 |

* cited by examiner

JOINT JOINING AN AIRCRAFT WING TO AN AIRCRAFT BODY

FIELD

This disclosure pertains to the construction of a joint joining portions of an aircraft. More specifically, this disclosure pertains to the construction of a joint that is one of the main connections between an aircraft wing and a fuselage of an aircraft body.

BACKGROUND

In the construction of modern aircraft it is often necessary to attach together structural panels constructed of different materials. For example, it is often necessary to attach a structural panel of composite material to a structural panel of metallic material, for example aluminum or titanium.

In attaching together large structural components of an aircraft, for example in attaching an aircraft wing to an aircraft body, one or more lap splices may be used as part of the construction attaching the aircraft wing to the aircraft body. In one example of attaching an aircraft wing to an aircraft body, an upstanding leg panel or a leg panel extending upwardly from the aircraft wing is overlapped with a skin panel on a side of the aircraft body. The overlapped leg panel and skin panel are then drilled through, preparing holes for fasteners to be inserted through the holes to secure the leg panel to the skin panel. In this example, an upstanding leg panel of an overwing T chord, which is typically constructed of a metallic material, is overlapped with a skin panel of the fuselage of the aircraft body, which is typically constructed of a composite or aluminum material. The holes for the fasteners used in attaching the leg panel to the skin panel are drilled through the leg panel overlapping the skin panel.

Drilling the fastener holes through the metallic material of the leg panel often results in burrs being formed at the edge of the entry of the fastener hole drilled through the leg panel and at the edge of the exit of the fastener hole drilled through the leg panel. A burr or burrs are more often created at the exit edge of the fastener hole drilled through the metallic material of the leg panel. A burr is a small, raised or projecting edge or point of the metallic material at the exit edge of the drilled hole.

The burrs created at the exit edge of the fastener hole function as a notch formed at the exit edge. The notch formed by the burr at the exit edge of the fastener hole can be a starting point of a crack formed in the metallic material of the leg panel. Thus, the notch formed by a burr at an exit edge of a fastener hole creates a fatigue critical region in a joint and the notch must be removed.

In order to remove the burrs from the exit edge of the fastener hole drilled through the leg panel, and possibly also from the entry edge of the fastener hole, the edge of the fastener hole must be accessed by a deburring tool. The deburring tool machines around the edge of the fastener hole and basically forms the edge of the fastener hole as a chamfered surface or a beveled edge surface around the opening of the fastener hole. This eliminates any potential crack forming in the metallic material of the leg panel at the edge of the fastener hole. However, it is often difficult to access the exit edge of the fastener hole with the deburring tool.

In the assembly of the aircraft, and in particular in joining an aircraft wing to an aircraft body, with the leg panel of the aircraft wing overlapping the skin panel of the aircraft body, it is often necessary to pry the overlapping panels apart. The overlapping panels are pried apart with a wedge, or a lever or other similar tool in order to gain access between the overlapping panels and gain access to the exit edge of the fastener hole. Prying the overlapping leg panel and skin panel apart to gain access to the exit edge of the fastener hole is a time consuming process. With there being many fastener holes drilled through the leg panel and the skin panel, prying the leg panel and the skin panel apart at locations of the many fastener holes adds significantly to the construction time of the aircraft and the cost of constructing the aircraft.

SUMMARY

The joint joining an aircraft wing to an aircraft body of this disclosure avoids the increase in production time and increase in production cost associated with removing burrs from an exit edge of a fastener hole drilled through a metallic panel. This is accomplished by simplifying the access to the exit edge of the fastener hole. This reduces the time required to access the exit edge of the fastener hole to remove burrs from the exit edge of the fastener hole, and thereby reduces production time and production cost.

The construction of the joint of this disclosure joins a skin panel on a side of the aircraft body to a leg panel extending upwardly from the aircraft wing.

The skin panel is an external, fuselage skin panel on a side of the aircraft body. The skin panel is constructed of a composite or a metallic material. The skin panel has an exterior surface that is directed toward an exterior of the aircraft body and an opposite interior surface that is directed toward an interior of the aircraft body. The skin panel has a bottom edge surface that extends between the exterior surface of the skin panel and the interior surface of the skin panel.

The aircraft wing has a top surface and an opposite bottom surface. The aircraft wing is constructed with an over wing T chord located at the Side-of-Body Rib on the top surface of the aircraft wing. An upstanding leg panel of the T chord extends upwardly from the T chord.

The leg panel extends upwardly from the top surface of the aircraft wing. The leg panel is constructed of a metallic material, such as titanium, aluminum or other equivalent material. The leg panel has an exterior surface directed toward the exterior of the aircraft body and an opposite interior surface directed toward the interior of the aircraft body. The leg panel has a top edge surface that extends between the exterior surface of the leg panel and the interior surface of the leg panel.

A splice panel is used in joining the aircraft wing to the aircraft body. The splice panel is constructed of a composite material or metallic material such as aluminum or titanium. The splice panel has an exterior surface and an opposite interior surface. The interior surface of the splice panel engages in surface engagement with the exterior surface of the leg panel and engages in surface engagement with the exterior surface of the skin panel. In joining the aircraft wing to the aircraft body, the skin panel and the leg panel are positioned in a single vertically oriented plane. The bottom edge surface of the skin panel is positioned directly opposite the top edge surface of the leg panel with a gap between the bottom edge surface and top edge surface. The splice panel is then attached to the leg panel and the skin panel.

In attaching the splice panel to the leg panel and the skin panel, prior to the skin panel being positioned above the leg panel, a lower half of the interior surface of the splice panel is positioned in surface engagement with the exterior surface of the leg panel.

Pairs of vertically spaced fastener holes are then drilled through the splice panel and the leg panel. The pairs of vertically spaced fastener holes are drilled through the splice panel and the leg panel at longitudinally spaced positions along the longitudinal lengths of the splice panel and the leg panel.

The splice panel is removed from the leg panel. With the splice panel removed from the leg panel, the drilled holes through the leg panel are easily accessed.

The drilled holes through the leg panel are then deburred using a deburring tool. The entrance edges of the holes are deburred and the exit edges of the holes are deburred. The exit holes of the splice panel, if made of a metallic material such as aluminum or titanium can also be deburred.

The splice panel is then positioned in surface engagement with the leg panel with the previously drilled holes through both panels aligned. Threaded fasteners are then inserted through the aligned holes of the splice panel and the leg panel. The threaded fasteners are tightened down, attaching the splice panel to the leg panel.

The skin panel of the aircraft fuselage is then positioned above the leg panel. As described earlier, the skin panel has an exterior surface and an opposite interior surface, and a bottom edge surface. The bottom edge surface of the skin panel is positioned above the top edge surface of the leg panel maintaining a gap between the bottom edge of the skin panel and the top edge of the leg panel, and the exterior surface of the skin panel is positioned in surface engagement with an upper half of the interior surface of the splice panel.

Pairs of vertically spaced fastener holes are then drilled through the splice panel and the skin panel. The pairs of vertically spaced fastener holes are drilled through the splice panel and the skin panel at longitudinally spaced positions that are vertically aligned with the pairs of vertically spaced fasteners that attach the splice panel to the leg panel.

Threaded fasteners are then inserted through the aligned holes of the splice panel and the skin panel. The threaded fasteners are tightened down, attaching the splice panel to the skin panel.

The plurality of fasteners extending through the splice panel and the leg panel and extending through the splice panel and the skin panel attach the splice panel to the leg panel and attach the splice panel to the skin panel and thereby attach the leg panel to the skin panel.

The features, functions, and advantages that have been discussed can be achieved independently in various embodiments or may be combined in yet other embodiments, further details of which can be seen with reference to the following description and drawings.

DETAILED DESCRIPTION

Figure 1:
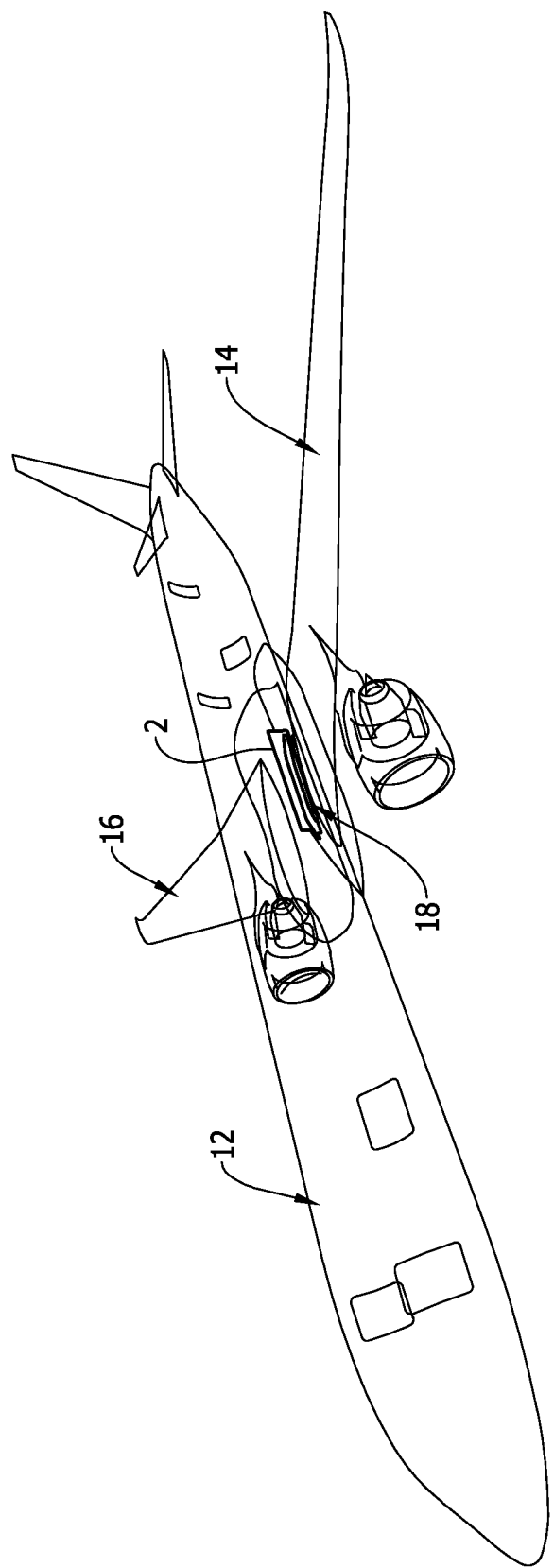
FIG. 1 is a representation of a perspective view of an aircraft and the position of the joint of this disclosure on the aircraft body and aircraft wing of the aircraft.

FIG. 1 is a representation of a perspective view of an aircraft body 12 and aircraft wings 14, 16 joined to the opposite sides of the aircraft body 12. The joint of this disclosure that joins the aircraft wings 14, 16 to the aircraft body 12 is positioned relative to the aircraft body 12 on the left side, or port side aircraft wing 14 in the area of the rectangle 2 represented in FIG. 1. It should be understood that the joint of this disclosure would also join the right side or starboard side aircraft wing 16 to the aircraft body 12. The joint of this disclosure connecting the port side or left side aircraft wing 14 to the aircraft body 12 will be disclosed herein, with it understood that the joint of this disclosure would also join the right side or starboard side aircraft wing 16 to the aircraft body 12.

Figure 2:
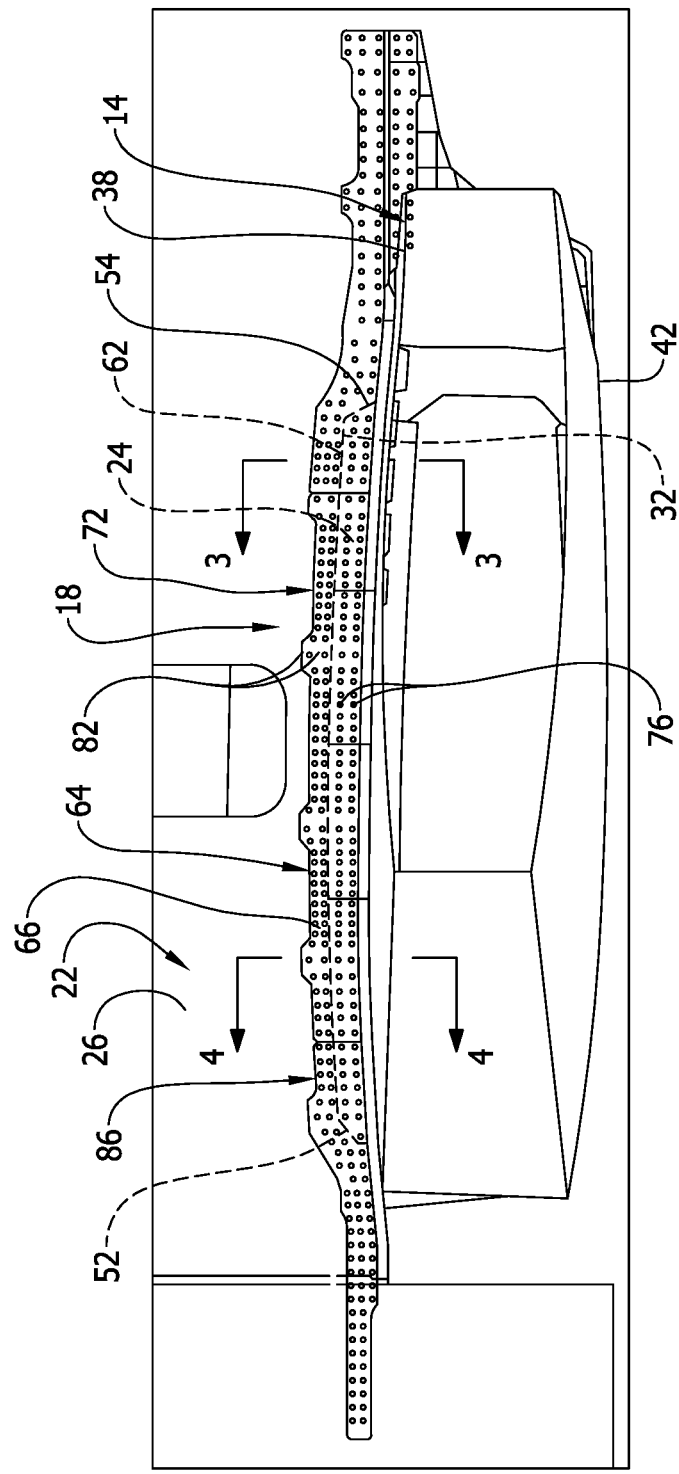
FIG. 2 is a side elevation view of the joint of this disclosure on the aircraft body and aircraft wing of FIG. 1.

FIG. 2 is a representation of a partial elevation view of the joint 18 of this disclosure that joins the aircraft wing 14 to the aircraft body 12, Only a small portion of the entire longitudinal length of the aircraft body 12 is represented in FIG. 2.

Figure 3:
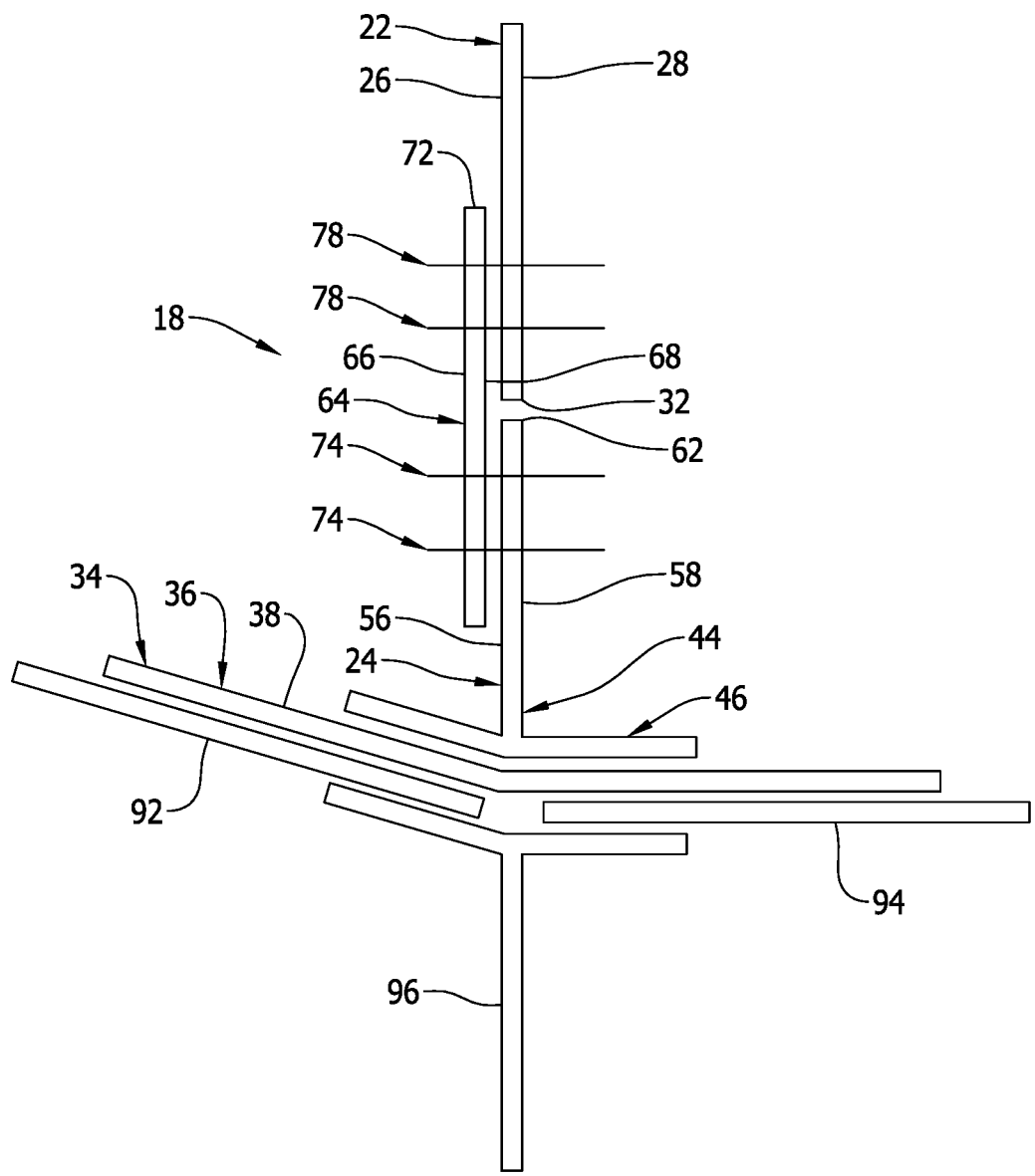
FIG. 3 is a schematic representation of a cross-section view through the joint of FIG. 2 in a plane along the line 3-3 of FIG. 2.
Figure 4:
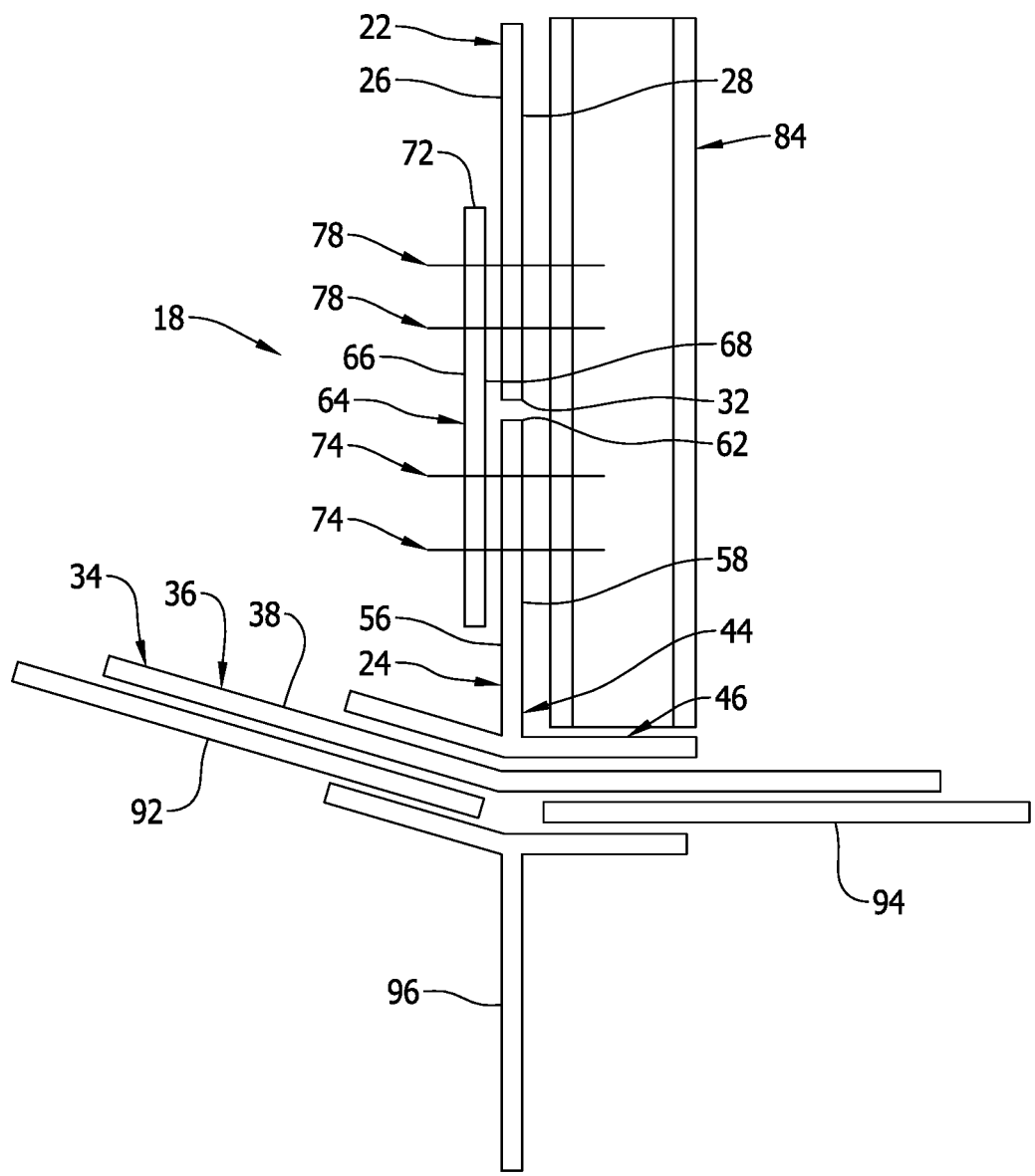
FIG. 4 is a schematic representation of a cross-section view through the joint of FIG. 2 in a plane along the line 4-4 of FIG. 2.

Additionally, only the longitudinal length of the wing box of the root of the aircraft wing that is attached to the aircraft body 12 is represented in FIG. 2. FIG. 3 is a schematic representation of a cross-section view through the joint 18 in a plane positioned along the line 3-3 of FIG. 2. FIG. 4 is a schematic representation of a cross-section view through the joint 18 in a plane positioned along the line 4-4 of FIG. 2. Referring to FIGS. 1 and 2, the construction of the joint 18 joins the aircraft wing 14 to the aircraft body 12. More specifically, the joint 18 joins a skin panel 22 on a side of the aircraft body 12 to an upstanding leg panel 24 extending upwardly from the aircraft wing 14.

Referring to FIGS. 3 and 4, the skin panel 22 is represented schematically. The skin panel 22 is an external, fuselage skin panel on a side of the aircraft body 12. The construction of the skin panel 22 is conventional. For example, the skin panel 22 is constructed of multiple layers of composite material sheets such as carbon fiber reinforced composite material fabric, carbon fiber reinforced composite material tapes, or a combination of these composite materials. The skin panel 22 could also be constructed of metallic materials such as aluminum or titanium. The skin panel 22 could have other equivalent constructions. The skin panel 22 represented in FIGS. 3 and 4 has an exterior surface 26 that is directed toward an exterior of the aircraft body 12 and an exterior environment of the aircraft body 12. The skin panel 22 has an interior surface 28 that is opposite the exterior surface 26 of the skin panel. The interior surface 28 of the skin panel 22 is directed toward an interior of the aircraft body 12. The interior surface 28 is not necessarily directed toward the interior of an aircraft cabin inside the aircraft body 12, but is directed toward the interior of the fuselage construction of the aircraft body 12. The skin panel 22 has a bottom edge defined by a bottom edge surface 32 of the skin panel that extends between the exterior surface 26 of the skin panel and the interior surface 28 of the skin panel. The bottom edge surface 32 is represented as a flat, planar surface in FIGS. 3 and 4. However, the bottom edge surface 32 could be a swarf surface or other equivalent surface configuration.

The aircraft wing 14 has a wing upper skin splice plate 34. The wing upper skin splice plate 34 has a conventional construction. For example, the wing upper skin splice plate 34 is constructed of metallic materials, such as aluminum or titanium, or equivalent materials. The layer of metallic material 36 defines the top surface 38 of the aircraft wing 14. The aircraft wing 14 also has a bottom surface 42 opposite the top surface 38 as represented in FIG. 2. The bottom surface 42 could also have a skin construction similar to that of the top surface of the aircraft wing 38.

As represented in FIGS. 3 and 4, the aircraft wing 14 is constructed with an over wing T chord 44 on the top surface 38 of the aircraft wing. The over wing T chord 44 is represented schematically in FIGS. 3 and 4. The over wing T chord 44 extends along a portion of the longitudinal length of the aircraft wing 14. The over wing T chord 44 could extend along the entire longitudinal length of the aircraft wing 14. The over wing T chord 44 has a lower flange 46 that is secured to the top surface 38 of the aircraft wing 14. The over wing T chord 44 also includes the upstanding leg panel 24 that extends upwardly from the lower flange 46 of the T chord 44 and upwardly from the aircraft wing 14. As represented in FIG. 2, the upstanding leg panel 24 has a longitudinal length that extends from a forward end edge 52 of the leg panel to a rearward end edge 54 of the leg panel. The over wing T chord 44 including the lower flange 46 and the upstanding leg panel 24 is constructed of a metallic material, such as titanium, aluminum, or other equivalent material. The leg panel 24 has an exterior surface 56 directed toward the exterior of the aircraft body 12 and toward an exterior environment of the aircraft body 12 and an opposite interior surface 56 directed toward the interior of the aircraft body 12. The interior surface 58 of the leg panel 24 is not necessarily directed toward the interior of the aircraft cabin of the aircraft body 12, but is directed toward the interior of the fuselage construction of the aircraft body 12. The leg panel 24 also has a top edge defined by a top edge surface 62 of the leg panel 24 that extends between the forward end edge 52 of the leg panel 24 and the rearward end edge 54 of the leg panel, and extends between the exterior surface 56 of the leg panel 24 and the interior surface 58 of the leg panel 24. The top edge surface 62 is represented as a flat, planar surface in FIGS. 3 and 4. However, the top edge surface 62 could be a curved surface or other equivalent surface configuration.

A splice panel 64 is used in forming the joint 18 joining the aircraft wing 14 to the aircraft body 12. Referring to FIGS. 3 and 4, the splice panel 64 is represented schematically. The splice panel 64 is constructed of composite material or metallic material, such as aluminum or titanium. For example, the splice panel 64 is constructed of multiple layers of composite material sheets such as carbon fiber reinforced composite fabric, carbon fiber reinforced composite tapes, or a combination of these composite materials or other equivalent materials.

The splice panel 64 represented in FIGS. 3 and 4 has an exterior surface 66 that is directed toward an exterior of the aircraft body 12 and an exterior environment of the aircraft 12. The splice panel 64 has an interior surface 68 that is opposite the exterior surface 66 of the splice panel. The interior surface 68 of the splice panel 64 is directed toward an interior of the aircraft body 12. The interior surface 68 is not necessarily directed toward the interior of an aircraft cabin inside the aircraft body 12, but is directed toward the interior of the fuselage construction of the aircraft body 12. A peripheral edge surface 72 of the splice panel 64 extends completely around the splice panel and extends between the exterior surface 66 of the splice panel and the interior surface 68 of the splice panel. The interior surface 68 of the splice panel 64 is configured to engage in surface engagement with the exterior surface 56 of the leg panel 24 and the exterior surface 26 of the skin panel 22 in constructing the joint that joins the leg panel 24 to the skin panel 22.

The splice panel 64 is used in constructing the joint 18 attaching the aircraft wing 14 to the aircraft body 12. In the construction of the joint 18 joining the aircraft wing 14 to the aircraft body 12, the leg panel 24 extending upwardly from the top surface 38 of the aircraft wing 14 is positioned vertically adjacent the skin panel 22 on the fuselage of the aircraft body 12. The bottom edge surface 32 of the skin panel 22 is positioned directly opposite and above the top edge surface 62 of the leg panel 24 maintaining a gap between the bottom edge surface 32 and the top edge surface 62 of the leg panel 24. The splice panel 64 is attached to the leg panel 24 and the skin panel 22 by a plurality of fasteners, with the plurality of fasteners attaching the splice panel 64 to the leg panel 24 and attaching the splice panel 64 to the skin panel 22 and thereby attaching the leg panel 24 to the skin panel 22.

In attaching the splice panel 64 to the leg panel 24, prior to the skin panel 22 and the leg panel 24 being positioned in a single vertically oriented plane with the skin panel 22 positioned directly above the leg panel 24, a lower half of the interior surface 68 of the splice panel 64 is positioned in surface engagement with the exterior surface 56 of the leg panel 24. The splice panel 64 is held in this position relative to the leg panel 24 by mechanical clamps or other equivalent tools.

Lower pairs of vertically spaced fastener holes 74 are then drilled through the splice panel 64 and the leg panel 24. These lower pairs of vertically spaced fastener holes 74 are represented schematically in FIGS. 3 and 4. The lower pairs of vertically spaced fastener holes 74 are drilled through the splice panel 64 and the leg panel 24 at longitudinally spaced positions along the longitudinal lengths of the splice panel 64 and the leg panel 24. As the pairs of vertically spaced fastener holes 74 are drilled through the splice panel 64 and the leg panel 24 along the longitudinal lengths of the splice panel 64 and the leg panel 24, fasteners such as threaded bolt and threaded nut fasteners 76, or other equivalent fasteners, can be inserted through the drilled holes and tightened in the drilled holes to further hold the splice panel 64 to the leg panel 24.

When the process of drilling the lower pairs of vertically spaced fastener holes 74 through the splice panel 64 and the leg panel 24 is complete, any fasteners 76 secured through the drilled holes are removed and the mechanical clamps holding the splice panel 64 and the leg panel 24 together are removed. The splice panel 64 is removed from the leg panel 24. With the splice panel 64 removed from the leg panel 24, the lower pairs of vertically spaced fastener holes 74 through the leg panel 24 are easily accessed.

With the splice panel 64 removed from the leg panel 24, the lower pairs of vertically spaced fastener holes 74 drilled through the leg panel 24 are deburred using a 19.1467-US-NP deburring tool. The entrance edges of the lower pairs of vertically spaced fastener holes 74 are deburred and the exit edges of the lower pairs of vertically spaced fastener holes 74 are deburred. The notches formed by the burrs, particular at the exit edges of the lower pairs of vertically spaced fastener holes 74 through the leg panel 24 are removed by the deburring tool. This removes any potential starting point of a crack formed in the metallic material of the leg panel 24. The exit holes of the fastener holes 74 drilled through the splice panel 64, if made from a metallic material such as aluminum or titanium could also be deburred.

The lower half of the interior surface 68 of the splice panel 64 is then positioned in surface engagement with the exterior surface 56 of the leg panel 24 with the previously drilled lower pairs of vertically spaced fastener holes 74 through both panels aligned. The lower pairs of threaded fasteners 76 are then inserted through the aligned lower pairs of vertically spaced fastener holes 74 of the splice panel 64 and the leg panel 24. The lower pairs of fasteners 76 are tightened down, attaching the splice panel 64 to the leg panel 24.

The skin panel 22 on the side of the fuselage of the aircraft body 12 is then positioned above the leg panel 24. The bottom edge surface 32 of the skin panel 22 is positioned directly opposite and above the top edge surface 62 of the leg panel 24 as represented in FIGS. 3 and 4. A portion of the exterior surface 26 of the skin panel 22 is positioned in surface engagement with the upper half of the interior surface 68 of the splice panel 64. The splice panel 64 and the skin panel 22 are then held together with mechanical clamps or other equivalent tools.

Upper pairs of vertically spaced fastener holes 78 are then drilled through the splice panel 64 and the skin panel 22. The upper pairs of vertically spaced fastener holes 78 are represented schematically in FIGS. 3 and 4. The upper pairs of vertically spaced fastener holes 78 are drilled through the splice panel 64 and the skin panel 22 at longitudinally spaced positions that are vertically aligned with the lower pairs of vertically spaced fastener holes 74 and the lower pairs of fasteners 76 that attach the splice panel 64 to the leg panel 24. As the upper pairs of vertically spaced fastener holes 78 are drilled at the longitudinally spaced positions, upper pairs of fasteners 82 such as threaded bolts and nuts can be inserted through the upper pairs of vertically spaced fastener holes 78 and tightened down to further hold the splice panel 64 to the skin panel 22.

When drilling the upper pairs of vertically spaced fastener holes 78 through the splice panel 64 and the skin panel 22 is complete, the upper pairs of threaded fasteners 82 are inserted through the aligned holes of the splice panel 64 and the skin panel 22. The upper pairs of threaded fasteners 82 are tightened down, attaching the splice panel 64 to the skin panel 22. The pluralities of fasteners 76 extending through the splice panel 64 and the leg panel 24 and the plurality of fasteners 82 extending through the splice panel 64 and the skin panel 22 attach the splice panel 64 to the leg panel 24 and the skin panel 22 and thereby attach the skin panel 22 to the leg panel 24.

The mechanical clamps holding the splice panel 64 and the skin panel 22 together are then removed, completing the attachment of the skin panel 22 to the leg panel 24 by the splice panel 64.

Referring to the schematic representation of FIG. 4, the lower pairs of vertically spaced fastener holes 74 drilled through the splice panel 64 and the leg panel 24 and the upper pairs of vertically spaced fastener holes 78 drilled through the splice panel 64 and the skin panel 22 can also extend into a vertically oriented column 84 of the fuselage frame. The lower pairs of fasteners 76 and the upper pairs of fasteners 82 that secure the splice panel 64 to the leg panel 24 and the skin panel 22 also secure the splice panel 64 to the column of the fuselage frame 84. The column of the fuselage frame 84 is constructed of a composite material or a metallic material such as aluminum or titanium.

As an alternative to the sequence of attaching the splice panel 64 to the leg panel 24 and the skin panel 22 discussed above, the splice panel 64 could first be attached to the skin panel 22 in the manner discussed above, and then the splice panel 64 could be attached to the leg panel 24, thereby attaching the skin panel 22 to the leg panel 24. Other equivalent sequences of attaching the skin panel 22 to the leg panel 24 using the splice panel 64 could also be employed in attaching the leg panel 24 to the skin panel 22.

Figure 5:
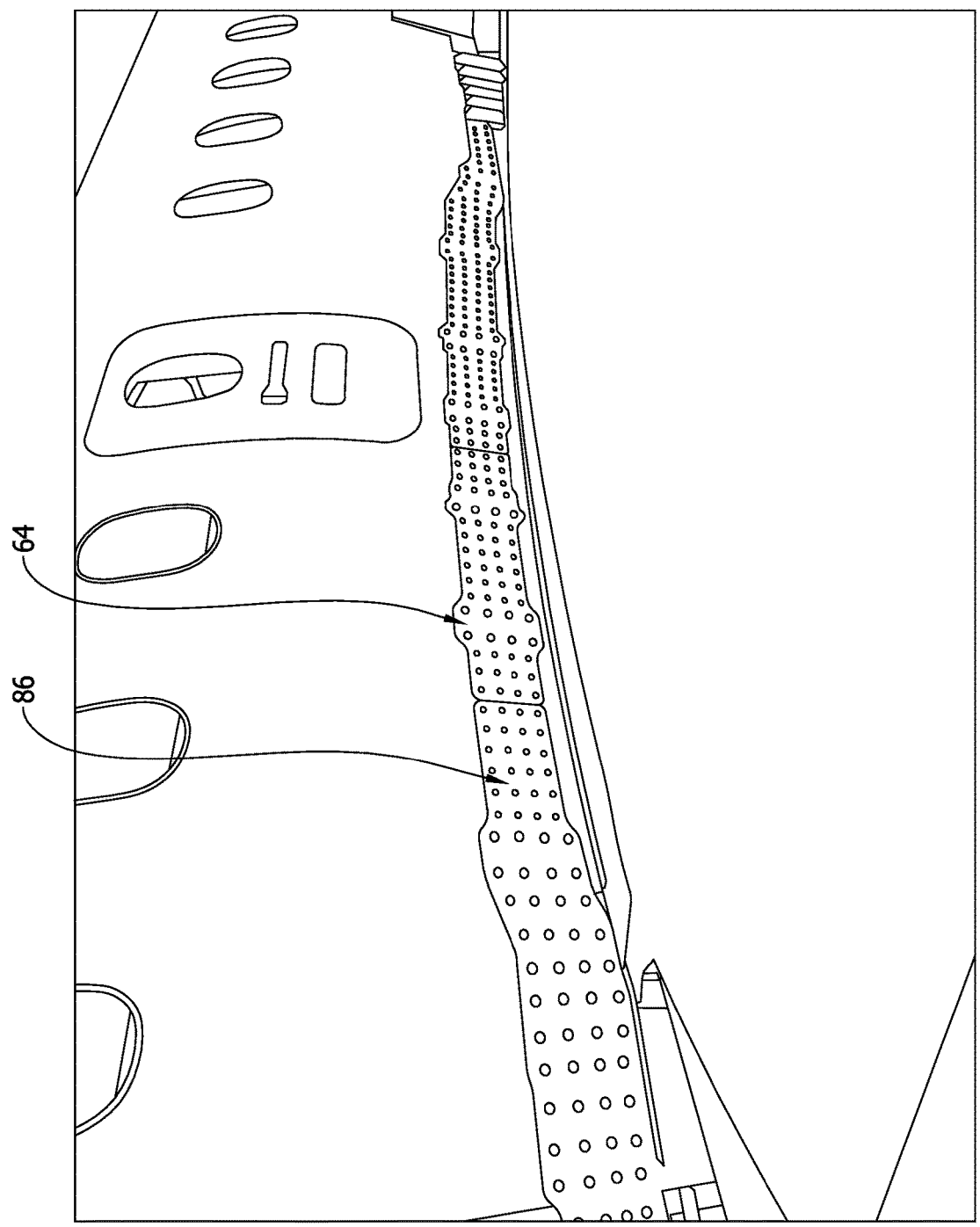
FIG. 5 is a representation of a perspective view of the joint of FIG. 1.

Referring to FIGS. 2 and 5, the splice panel 64 securing the leg panel 24 to the skin panel 22 is a first splice panel. There could also be a second splice panel 86 that is attached to the leg panel 24 and the skin panel 22 in the same manner as the first splice panel 64 described above. Together, the first splice panel 64 and the second splice panel 86 function to join the aircraft wing 14 to the aircraft body 12. There could also be a third splice panel or more splice panels used in the joint 18 joining the aircraft wing 14 to the aircraft body 12.

Also represented schematically in FIGS. 3 and 4 is a wing outboard upper skin 92, a wing inboard upper skin 94, and a Side-of-Body wing Rib 96.

As various modifications could be made in the construction of the joint joining an aircraft wing to an aircraft body and its method of use herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A joint joining an aircraft wing to an aircraft body, the joint comprising:
   a skin panel on a side of the aircraft body;
   a leg panel extending upwardly from the aircraft wing;
   a splice panel attached to the leg panel and attached to the skin panel; and,
   a plurality of fasteners extending through the splice panel and the leg panel and extending through the splice panel and the skin panel, the plurality of fasteners attach the splice panel to the leg panel and attach the splice panel to the skin panel.

2. The joint of claim 1, further comprising:
   the splice panel engaging in surface engagement with the leg panel and engaging in surface engagement with the skin panel.

3. The joint of claim 1, further comprising:
   the leg panel and the skin panel are positioned in a single vertically oriented plane.

4. The joint of claim 1, further comprising:
   the leg panel has a top edge;
   the skin panel has a bottom edge; and,
   the bottom edge of the skin panel is positioned directly opposite and above the top edge of the leg panel.

5. The joint of claim 1, further comprising:
   the splice panel is a first splice panel engaged in engagement with the leg panel and engaged in engagement with the skin panel;
   a second splice panel is engaged in engagement with the leg panel and is engaged in engagement with the skin panel;
   the plurality of fasteners extend through the first splice panel and the leg panel and extend through the first splice panel and the skin panel; and,
   the plurality of fasteners extend through the second splice panel and the leg panel and extend through the second splice panel and the skin panel, the plurality of fasteners attach the first splice panel to the leg panel and attach the first splice panel to the skin panel and the plurality of fasteners attach the second splice panel to the leg panel and attach the second splice panel to the skin panel and thereby attach the skin panel to the leg panel.

6. The joint of claim 1, further comprising:
the plurality of fasteners are removable from extending through the splice panel and the leg panel and from extending through the splice panel and the skin panel to detach the splice panel from the leg panel and detach the splice panel from the skin panel.

7. The joint of claim 1, further comprising:
the leg panel is constructed of one of a metallic material and a composite material;
the skin panel is constructed of one of a metallic material and a composite material; and,
the splice panel is constructed of one of a metallic material and a composite material.

8. The joint of claim 1, further comprising:
the skin panel is an external, fuselage skin panel.

9. The joint of claim 1, further comprising:
the plurality of fasteners include pairs of vertically spaced upper fasteners extending through the splice panel and the skin panel and pairs of vertically spaced lower fasteners extending through the splice panel and the leg panel.

10. The joint of claim 9, further comprising:
the pairs of vertically spaced upper fasteners and the pairs of vertically spaced lower fasteners are positioned in a single vertically oriented plane.

11. A joint joining an aircraft wing to an aircraft body, the joint comprising:
an aircraft body;
an aircraft wing, the aircraft wing having a top surface and an opposite bottom surface;
a skin panel on a side of the aircraft body, the skin panel having an exterior surface that is directed toward an exterior of the aircraft body and an opposite interior surface that is directed toward an interior of the aircraft body;
a leg panel extending upwardly from the top surface of the aircraft wing, the leg panel having an exterior surface directed toward the exterior of the aircraft body and an opposite interior surface directed toward the interior of the aircraft body;
a splice panel, the splice panel having an exterior surface and an opposite interior surface, the interior surface of the splice panel engaging in engagement with the exterior surface of the leg panel and engaging in engagement with the exterior surface of the skin panel; and,
a plurality of fasteners extending through the splice panel and the leg panel and extending through the splice panel and the skin panel, the plurality of fasteners attaching the splice panel to the leg panel and attaching the splice panel to the skin panel and thereby attaching the skin panel to the leg panel.

12. The joint of claim 11, further comprising:
the interior surface of the splice panel engaging in surface engagement with the exterior surface of the leg panel and the interior surface of the splice panel engaging in surface engagement with the exterior surface of the skin panel.

13. The joint of claim 11, further comprising:
the skin panel and the leg panel are positioned in a single vertically oriented plane.

14. The joint of claim 11, further comprising:
the leg panel has a top edge defined by a top edge surface that extends between the exterior surface of the leg panel and the interior surface of the leg panel;
the skin panel has a bottom edge defined by a bottom edge surface that extends between the exterior surface of the skin panel and the interior surface of the skin panel; and,
the bottom edge surface of the skin panel is positioned directly opposite and above the top edge surface of the leg panel.

15. The joint of claim 11, further comprising:
the splice panel is a first splice panel having an exterior surface directed away from the aircraft body and an opposite interior surface, the interior surface of the first splice panel engaging in engagement with the exterior surface of the leg panel and engaging in engagement with the exterior surface of the skin panel;
a second splice panel, the second splice panel having an exterior surface directed away from the aircraft body and an opposite interior surface, the interior surface of the second splice panel engaging in engagement with the exterior surface of the leg panel and engaging in engagement with the exterior surface of the skin panel; and,
the plurality of fasteners extending through the first splice panel and the leg panel and extending through the first splice panel and the skin panel, the plurality of fasteners extending through the second splice panel and the leg panel and extending through the second splice panel and the skin panel, the plurality of fasteners attaching the first splice panel and the second splice panel to the leg panel and the skin panel and thereby attaching the skin panel to the leg panel.

16. The joint of claim 11, further comprising:
the plurality of fasteners are removable from extending through the splice panel and the leg panel and from extending through the splice panel and the skin panel to detach the splice panel from the leg panel and detach the splice panel from the skin panel.

17. The joint of claim 11, further comprising:
the leg panel is constructed of one of a metallic material and a composite material;
the skin panel is constructed of one of a metallic material and a composite material; and,
the splice panel is constructed of one of a metallic material and a composite material.

18. The joint of claim 11, further comprising:
the skin panel is an external, fuselage skin panel.

19. A method of joining an aircraft wing to an aircraft body, the method comprising:
positioning a skin panel on a side of an aircraft body directly opposite and above a leg panel extending upwardly from an aircraft wing;
positioning a splice panel in engagement with the leg panel and in engagement with the skin panel; and,
positioning a plurality of fasteners extending through the splice panel and the leg panel and extending through the splice panel and the skin panel with the plurality of fasteners attaching the splice panel to the leg panel and attaching the splice panel to the skin panel.

20. The method of claim 19, further comprising:
positioning a bottom edge of the skin panel directly opposite and above a top edge of the leg panel;

positioning the splice panel in engagement with the leg panel and in engagement with the skin panel over the bottom edge of the skin panel and over the top edge of the leg panel; and, positioning the plurality of fasteners extending through the splice panel and the leg panel and extending through the splice panel and the skin panel with the plurality of fasteners attaching the splice panel to the leg panel and attaching the splice panel to the skin panel over the bottom edge of the skin panel and over the top edge of the leg panel.

\* \* \* \* \*